Jan. 31, 1928. 1,657,749

H. P. HANSON

FLOWERPOT HANDLE STRUCTURE

Filed April 1, 1926

Inventor
Hans Peter Hanson
By Winfield D. Williams
Atty.

Patented Jan. 31, 1928.

1,657,749

UNITED STATES PATENT OFFICE.

HANS PETER HANSON, OF CHICAGO, ILLINOIS.

FLOWERPOT-HANDLE STRUCTURE.

Application filed April 1, 1926. Serial No. 99,068.

This invention relates to the decorative arts, and especially with reference to adjustable handles for vessels in the nature of flower pots.

The primary object of this invention is to provide a decorative handle for a flower pot or like vessel consisting of a metal member as a foundation member and a decorative material thereon forming a handle which can be comfortably gripped and which can be decoratively rendered in combinations of color to artistically harmonize with the plant characteristics in the flower pot.

It is well known that a single wire, in itself, does not form a satisfactory device for lifting and carrying a weight; whereas on the other hand a material adapted to form a good handle holding material and one that is subject to decorative element has not ordinarily qualities adapting it to independent strength and support in lifting and carrying weights.

An illustrative embodiment of the invention is shown in the accompanying drawing wherein.

Figure 1:
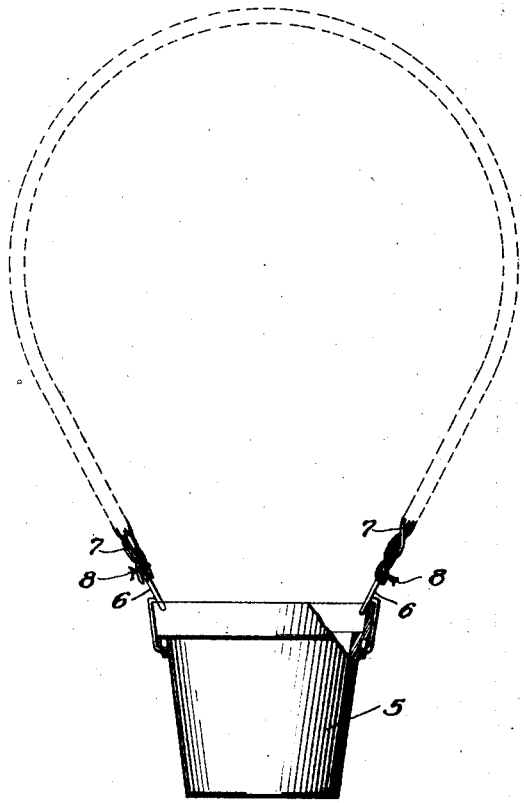
Fig. 1 shows a flower pot with the adjustable handle attached, its bow member sketched in outline, the terminal portions of the decorative feature shown.
Figure 2:
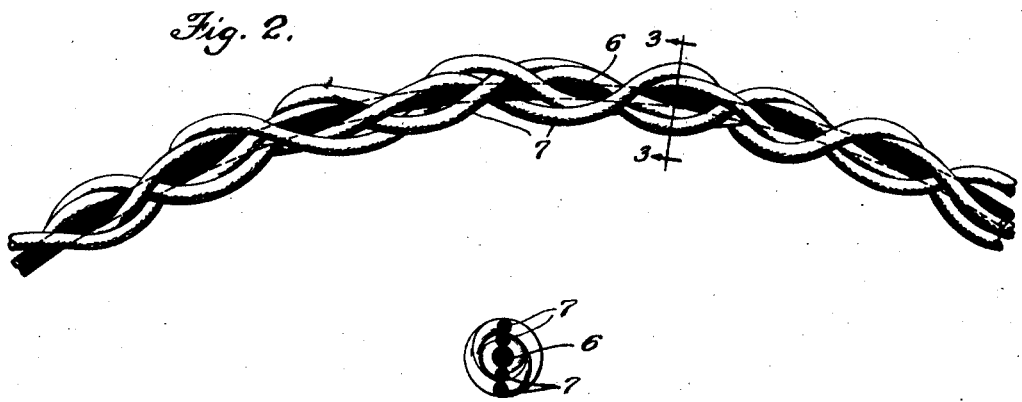
Fig. 2 is an enlarged illustration of the structure of the handle showing a detail substantially normal.
Figure 3:
Fig. 3 is a cross-section of Fig. 2 at the point of the arrows 3—3.

As illustrated, the structure consists of a wire center 6, being a single wire with its terminal portions formed to adjustingly grip the flanged rim of a flower pot. Associated with this metal central member 6 are members 7 twisted or plaited in various decorative forms around and along the central member 6. These members 7 are composed of flexible material such as reed, rattan, and the like materials. This material 7 is preferably a material having more or less absorbent qualities or possessing characteristics which are responsive to chemical dyes. The metal central member is treated to a finishing decorative coat by dipping it in or spraying it with a coat of paint producing such normal effects as are characteristic of paint of various qualities and colors; the reed or rattan member I treat with dye stuff producing color effects artistic and capable of the most effective combinations with the painted metal member. I provide a means 8 preferably fine wire or similar material to tie the ends of the members 7 at or closely adjacent to the pot attaching portions of the central member.

This device makes a convenient handle for a flower pot, as capable of being handled as a basket; and the method of decoration herein described is not only capable of the widest variation but is capable of color effects which are not possible to any system of painting.

I claim:

1. An article of manufacture comprising a flower pot holder consisting of a central single metal member adapted to serve as a substantially fixed frame, the said central member being decorated with paint, a plurality of flexible decorative members consisting of a reed-like material ornamentally so platted about the said central member as to leave said central member spacedly exposed, said flexible decorative members securely bound to the metal member at or adjacent the pot attaching portions of the metal member.

2. An article of manufacture comprising utility with decorative qualities consisting of a basic decoratively treated metal member having terminal portions adapted to associate it with a flower pot and serve as a demountable handle; reed-like members dye treated artistically platted over the metal base member and decoratively associated therewith; the metal member exposed at spaced intervals.

3. A decorative flowerpot handle comprising a metal base member having gripping terminals adapted to associate it with a flowerpot, the said metal member treated to a decorative coating; a plurality of reed-like members-decoratively treated chemically-associated in artistic manner about a portion of the basic metal member and maintaining said metal member exposed at spaced intervals; means to fixedly attach the reed-like members to the basic metal member.

4. A device of the character described consisting of a central metal member adapted to be grippingly associated with a vessel, the said central member being finished with a decorative material; a reed-like member chemically colored so platted about the metal member between the end grips as to leave the metal portion spacedly exposed: said reed-like member adapted to increase the holding characteristics of the handle and provide artistic rendering to a pot of plants.

Signed at Chicago, Illinois, Mar. 23rd 1926.

HANS PETER HANSON.